(12) United States Patent
Cheng

(10) Patent No.: US 6,990,893 B2
(45) Date of Patent: Jan. 31, 2006

(54) BREAKFAST GRIDDLE

(75) Inventor: Stanley Kin Sui Cheng, Vallejo, CA (US)

(73) Assignee: Meyer Intellectual Properties Limited, (VG)

( * ) Notice: Subject to any disclaimer, the term of this patent is extended or adjusted under 35 U.S.C. 154(b) by 92 days.

(21) Appl. No.: 10/653,841

(22) Filed: Sep. 2, 2003

(65) Prior Publication Data

US 2005/0045046 A1   Mar. 3, 2005

(51) Int. Cl.
*A47J 37/10* (2006.01)

(52) U.S. Cl. .............................. 99/422; 99/426; 99/448; 99/339

(58) Field of Classification Search .................. 99/422, 99/448, 426, 339, 357; D7/357, 361; 220/23.86, 220/737, 752, 758
See application file for complete search history.

(56) References Cited

U.S. PATENT DOCUMENTS

| | | | |
|---|---|---|---|
| 867,086 A | 9/1907 | Sullivan | 126/173 |
| 1,379,072 A | 5/1921 | Winkelman | |
| 1,505,675 A * | 8/1924 | Stirn | 99/339 |
| 2,515,617 A | 7/1950 | Tilford | 126/390 |
| D162,905 S * | 4/1951 | Utz | D7/357 |
| 3,713,380 A * | 1/1973 | Bardin | 99/422 |
| 3,780,978 A | 12/1973 | Proul | 249/135 |
| 4,462,388 A | 7/1984 | Bohl et al. | 126/390 |
| D275,440 S | 9/1984 | Matsuhisa | D7/357 |
| 5,131,320 A * | 7/1992 | Jensen et al. | 99/422 |
| 5,481,963 A | 1/1996 | Sasona | 99/335 |
| D380,347 S | 7/1997 | Norton | D7/409 |
| D383,354 S | 9/1997 | Nassar | D7/357 |
| 5,967,022 A | 10/1999 | Moschella | 99/339 |
| 6,386,092 B1 | 5/2002 | Grohs | 99/339 |

* cited by examiner

*Primary Examiner*—Reginald L. Alexander
(74) *Attorney, Agent, or Firm*—Edward S. Sherman (57) ABSTRACT

A cooking pan has a large flat cooking surface subdivided into at least one enclosed region by a convex ridge. The enclosed regions size, shape and location facilitate the preparation of pancakes, while other breakfast foods are optionally prepared in the non-enclosed portion of the cooking surface.

26 Claims, 5 Drawing Sheets

BREAKFAST GRIDDLE

CROSS REFERENCE TO RELATED APPLICATIONS

None

BACKGROUND OF INVENTION

The present invention relates to cooking devices and more particularly pertains to pans for cooking foods in a particular shape and cooking several different food items at once over a single heat source.

Pancakes, in particular, generally require much higher temperatures than do other grille cooked foodstuffs and thus add nuisance variables. For instance if a chef is limited to the use of a single grille, a sizable area of this cooking surface must be raised in temperature of approximately 100 degrees to accommodate pancake preparation. Numerous prior methods are available for preparing pan or griddle cooked foods in a particular shape using a shaped pan or pan insert. For example, the mass production of pancakes, such as in high volume specialty restaurants, institutions or for repacking as frozen food to be warmed in a microwave oven, can be accomplished using a variety of methods wherein the liquid pancake batter is confined in a circular dish or plate. Many inventors attempted to automate the manufacture of pancakes, one of the first being Jaffe, U.S. Pat. No. 2,830,529. The particular shape or outline is dependent on the operator or user of this assembly.

Automated pancakes cooking devices provide for the automated turning of batter after the first side is cooked. For example, U.S. Pat. No. 5,481,963 teaches an electric pancake maker using a metering pump system to dispense batter simultaneously onto a first cooking surface assembly including a plurality of concave cooking dishes; a heated smooth faced second cooking surface assembly and a means to pivot those surfaces to flip partially cooked pancakes from one surface to the other, and ultimately discharge fully cooked pancakes in an automated manner.

Other forms of high volume pancake cooking equipment confine batter to a fully enclosed cavity for simultaneous cooking of both sides.

As such, automated high volume cooking equipment is neither versatile in function, as the insert or cavities are not designed to facilitate manual removal of cooked food of various thicknesses and consistencies, in accordance with a wide range interests that can be expected of consumers cooking at home.

Other methods of cooking uniform serving portions of shapes from liquid or batter mixtures include using a ring type enclosure having a vertical wall that is placed on a larger flat griddle. As an explanatory example, the use of such outline forms is disclosed in U.S. Pat. No. 3,780,978. The inventor teaches that the form is placed on a frying pan or grill for cooking foods. The outline-confined foods, such as eggs or batter, are rapidly cooked to form a skin or layer at the lower surface and outer perimeter, which skin permits removal of the outline ring or form while the foodstuff retains the shape of the outline. This outline form is not integral with the griddle or frying pan. It is unclear whether the foodstuff may be fried or cooked on both sides without disturbing the fluid center portion of the crust surrounded the already-formed shell of the crust. Thus, it is unclear whether the foodstuff may be fried on both sides without disturbing the outline shapes.

U.S. Pat. No. 5,131,120 discloses a cooking utensil with an image contoured on its frying surface for transfer of such image to either one or both of the upper and lower surfaces of a foodstuff fried on the frying surface.

U.S. Pat. No. 5,967,022 discloses a cooking system for cooking several different food items at once over a single heat source, combining ring inserts and cavity type features. The cooking system includes a pan with a base panel, a peripheral sidewall upwardly extending from the base panel, and a handle extending from the peripheral sidewall. An insert rests on an upper edge of the peripheral sidewall of the pan. The insert comprises an upper panel and an abutting wall downwardly extending from a rear edge of the upper panel and engaging the base panel of the pan. The abutting wall is designed for confining food to an area of the pan not covered by the insert. The insert has a pair of depressions designed for receiving food therein.

Other cooking pans and griddles utilize cavities or multiple compartment that cover the entire cooking surface, and generally include U.S. Design Pat. Nos. D380,347, D275,449; D383,354, D275,440; D275,440 and D380,347, D275,449; D383,354, D275,440; D275,440 and D 383,354; but also U.S. Pat. Nos. 867,086; 2,515,617; 4,462,388; and 6,386,092, which are incorporated herein by reference.

However, despite the various attempts to improve the efficacy of cooking pancakes, or provide for the simultaneous cooking of pancakes and other types of foods, the prior art solutions compromise several aspects of functionality of importance to the consumer and home cook.

In particular, with respect to permanent cavity pans it can be difficult to remove and flip pancakes, to cook the second side, without damage. Pans and devices that utilize wall inserts, and thus enable multiple uses of the same pan, are generally unattractive for consumers, as the inserts are either poor barriers to low viscosity batters (which can seep through the interface of the cooking surface and insert) or as a separate component, requires extra cleaning efforts.

Overlay type insert are unattractive for similar reasons, and do not truly enable simultaneous cooking of other foods, as the poor heat transfer to the inserts may require a compromise with the heat setting that is most desirable for the underlying pan. In fact, this can be a distinct disadvantage as non-stick coatings on some pans can be damaged, or in some circumstances emit unsafe fumes when the recommended heating limits are exceeded.

It is therefore a first object of the present invention to provide a cooking pan suitable for home or consumer use that enables the consistent cooking of pancakes; as well as related foods prepared from liquids, pastes or batters; the cooked food having an aesthetically pleasing appearance, being uniform in shape and completely cooked through.

It is another object of the present invention to provide the aforementioned benefits in a cooking pan without increasing the difficulty of removing cooked foods or cleaning the pan.

It is yet a further objective of the present invention to provide the aforementioned benefits for a cooking pan without using multiple separate components and retain the versatility for multiple uses and the simultaneous cooking of a variety of food types.

SUMMARY OF INVENTION

In the present invention, the first object is achieved by providing a griddle or sauté style-cooking pan having a substantially planar cooking surface subdivided by convex ridges to define enclosed regions for cooking foods from liquids, semi-liquids or paste ingredients. The areas enclosed by the convex ridges define the pancake cooking area, by either confining batter or providing visual indicia of the amount of batter to be poured.

A second aspect of the invention is characterized in that a substantial portion of the planar cooking surface is outside the enclosed regions, with the bottom of the pan (that forms the planar cooking surface) having a substantially uniform thickness in the enclosed and non-enclosed regions.

Although a peripheral wall surrounds the entire cooking surface, in preferred embodiment, the wall does not define enclosed regions, making it easier for the cook to remove and flip the pancakes with a spatula.

In yet another aspect of the invention, the enclosed areas are sized and arranged in various useful combinations for cooking a combination of breakfast foods simultaneously in the different areas, as the convex ridges isolate cooking oil or fat rendered from various foodstuffs.

In a further aspect of the invention, the cooking pan may include a pouring spout for the continuous removal of cooking fat.

Therefore, in a more preferred embodiment the pan has a square shape, the convex ridges defining circular enclosed regions. The enclosed regions have a diameter slightly less than half the width of the pan and are disposed adjacent to each other leaving an adjacent non-enclosed region that is preferably slightly larger. As will be further described, this larger area provides versatility and enables the complete cooking of uniform serving portions of foods. The larger area can receive pancakes or other food items after fixing the shape in the enclosed regions by an initial cooking to congeal one side, the transferred food items being flipped over for cooking the opposite side.

The above and other objects, effects, features, and advantages of the present invention will become more apparent from the following description of the embodiments thereof taken in conjunction with the accompanying drawings.

DETAILED DESCRIPTION

Figure 1:
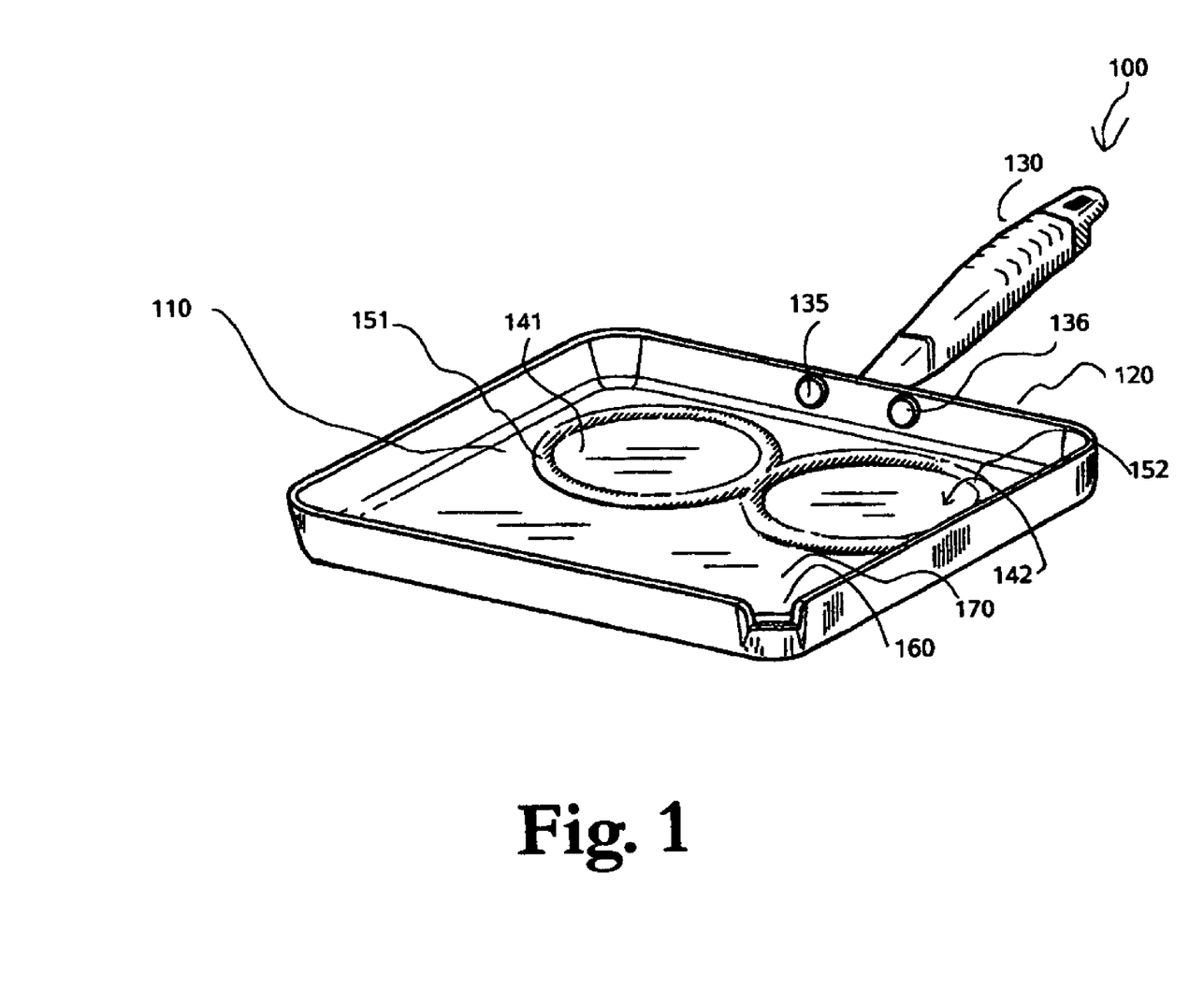
FIG. 1 shows a perspective view of a cooking pan embodying the invention.

In accordance with the present invention, FIG. 1 illustrates in perspective view a cooking pan 100 having a substantially planar cooking surface 110 as the bottom of the pan, an upward extending peripheral wall 120 is attached to and surrounding cooking surface 110. A handle for grasping the pan 130 extends outward from the point of attachment, via rivets 135 and 136, with wall 120. The substantially planar bottom 110 is segregated into multiple regions by convex ridges 151 and 152. Each of convex ridges 151 and 152 forms a closed geometric figure, in this embodiment a circle, enclosing regions 141 and 142 of the cooking surface. Thus, the remaining region 170 of substantially planar bottom 110 extends to wall 120 to surround the enclosed regions 141 and 142. In a preferred embodiment, a pouring spout 160 is provided at a corner of the wall 120 on the side opposite handle 130.

As distinguished from prior art cooking utensils, the convex ridges 141 and 142 having a substantially continuous profile to define enclosed regions that are optionally used for cooking different foodstuffs than the surrounding region 170, or alternatively used for controlling the shape, size or portions of a liquid, semi-fluid paste or mixture that congeals to form a solid on cooking.

In the more preferred embodiments, enclosed regions 141 and 142 have a diameter of from about 30 to 160 mm. To the extent the enclosed regions are intended for cooking pancakes, they might vary considerably within this range; from about 30 to 50 mm (for so-called silver dollar pancakes) to about 150 mm diameter. A diameter of 100 to 120 mm is more preferable for portion control, but is also a convenient size for flipping pancakes.

Figure 2A:
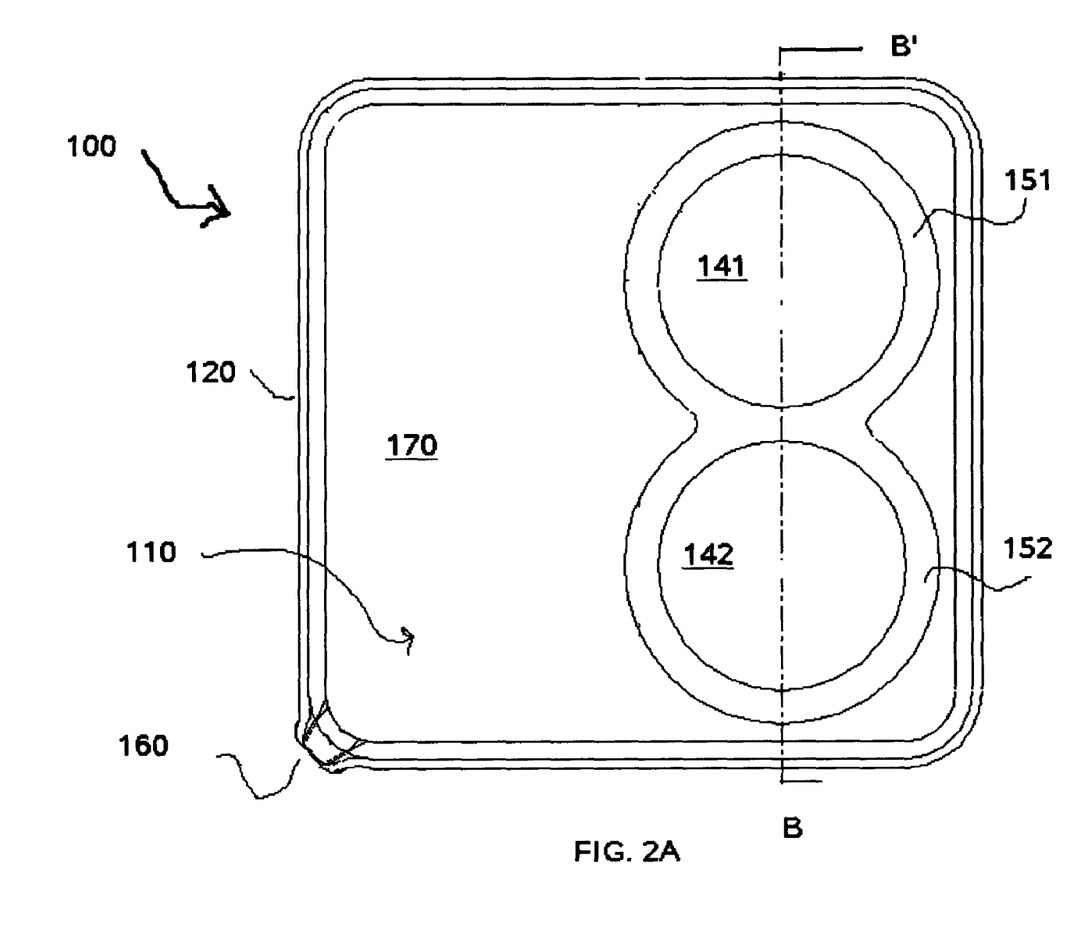
FIG. 2A shows a plan view of the cooking pan of FIG. 1.

FIG. 2A shows a plan view of the cooking pan of FIG. 1. It should be appreciated that in this preferred embodiment the enclosed regions are disposed toward one side of the pan being spaced close together to provide an adjacent region 170 of a larger surface area with wider lateral dimensions than the enclosed regions. Further, convex ridges 151 and 152 merge in the region of closest proximity to form a common ridge 155. This configuration is particularly advantageous for the systematic cooking of foodstuffs that are initially liquid, such as pancake mix and eggs, but thereafter congeal upon cooking one side. Thus, the enclosed regions are designed for cooking the first side, so that the cook can then flip the partially cooked item placing the uncooked side onto the surrounding area. Accordingly, in a preferred embodiment, the surrounding area is large enough to contain the mirror image of the enclosed regions such that the flipped items complete their cooking on the second side adjacent to the enclosed area.

Figure 2B:
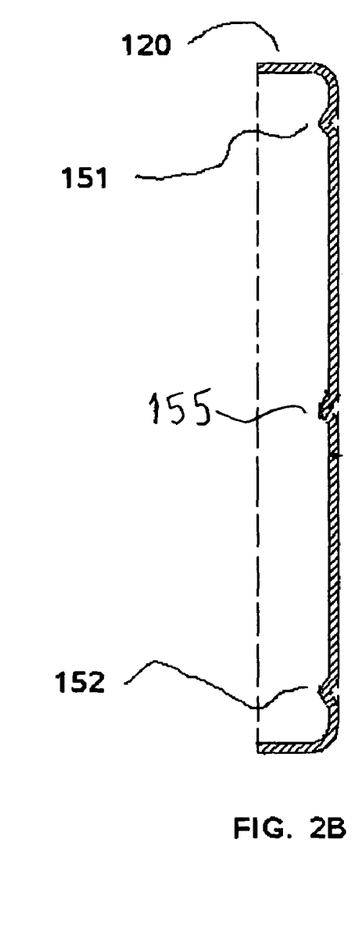
FIG. 2B shows cross-section through the pan of FIG. 2A.
Figure 2C:
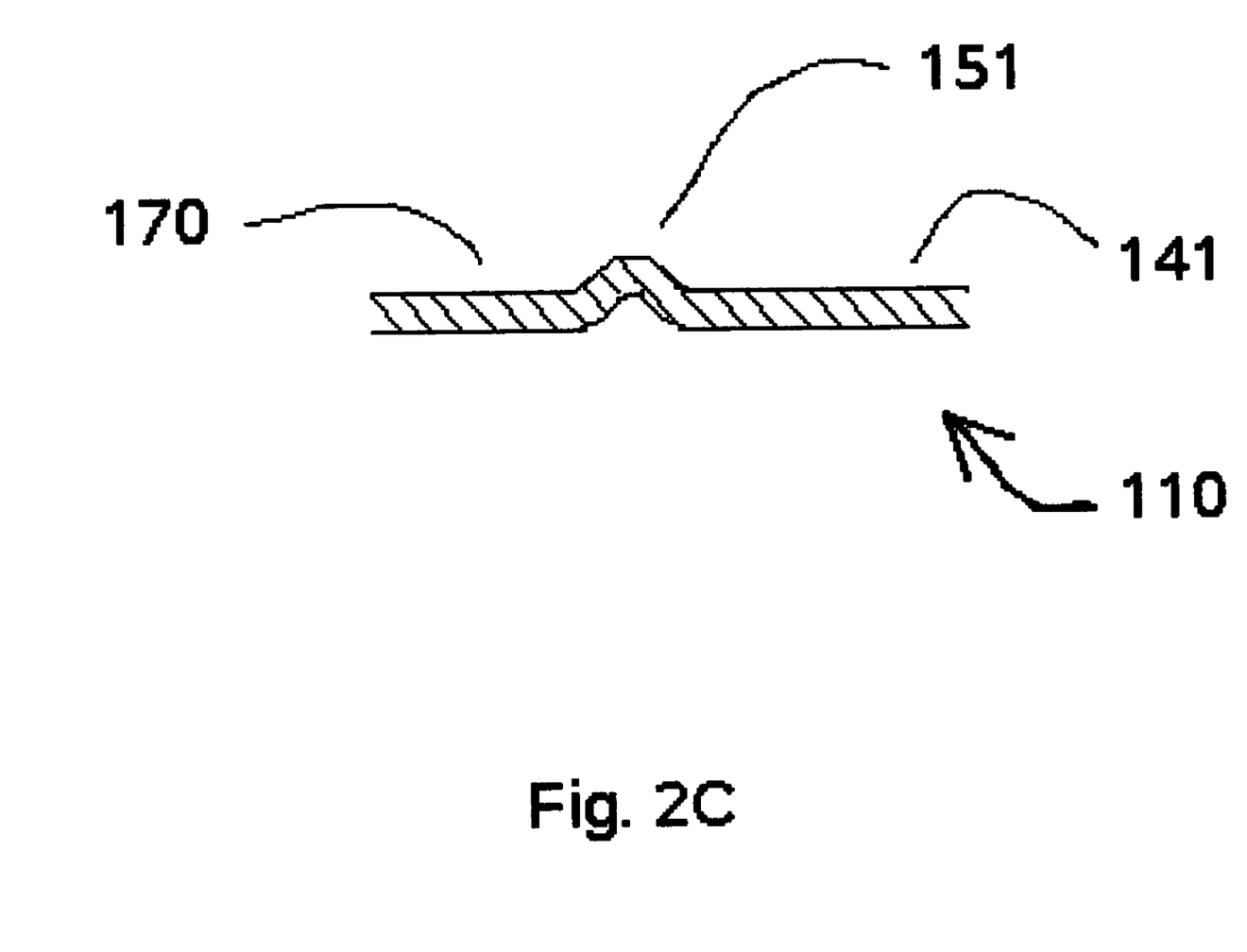
FIG. 2C shows a detail of the cross-section in FIG. 2B.

FIG. 2B illustrates the profile of the bottom of the pan (via the cross section B–B' as indicated by the reference marker in FIG. 2) showing the variation in convex ridge profile between single ridges 151 and 152 adjacent the edges of the pan and merged region 155. Thus, in the preferred embodiment, the convex ridge 151 has a continuously curving profile and a relatively low height, of circa 4 mm, with a total width of 8–12 mm. Referring to the more detailed cross-section of convex ridge 151 in FIG. 2C, the continuous profile defining the convex ridge is further characterized in one aspect as having a radius of curvature at the transition from the planar surface of at least 1 mm, but more preferably at least 2 mm. The radius of curvature at the apex of the ridge is preferably within the same range, but can vary depending on the overall width of the ridge and total height. In the most preferred embodiments, the convex ridge is fabricated by deforming a planar sheet of metal used to form the bottom of the pan, as this produces a substantially identical but concave profile in the bottom of the pan on the reverse side of the cooking surface.

Further, as the ridges are preferably formed in the pan by deformation, the height range available will depend on the pan thickness and material, which might be selected for different cooking or aesthetic characteristics, and malleability. Although the convex ridge height is preferably in the range of 1 to 10 mm, and more preferably 2 to 6 mm, it should be appreciated that this is still less than one third to one tenth the height the surrounding peripheral wall 120, and as such does not disturb alternative uses of the pan. Accordingly, maintaining this ratio of ridge to wall height with other wall heights, including slopping or curved walls that deviate from vertical, provides the consumer with great versatility, as the cook can utilize the entire cooking surface for other purposes, without interference or detrimental effects arising from the coexistence of the enclosed regions.

An exemplary height of the pan wall 120 is about 30 mm, as measured from the lower surface of the bottom to the upper edge of wall 120. An exemplary length and width of the pan is about 28 cm by 28 cm, however the length and width need not be equal. An exemplary length of the handle is about 20 cm. However, it is to be understood that the invention may be constructed in other dimensions as well; including omitting the handle for a dedicated insert griddle, as shown in FIG. 4B.

Depending on the viscosity and cooking characteristics of the pancake batter or other foodstuff, the enclosed regions optionally provide for controlling the pancake size via portion control. The ridges can be used as a visual aid to stop adding additional high viscosity or thixotropic batter, as well as for confining a low viscosity batter or food mixture to the enclosed region.

The height and continuous profile of the convex ridges are not only sufficient for these purposes, but facilitate the removal of cooked foods without damaging the pan finish or distorting or tearing the food rendering it unattractive. A spatula is easily inserted under semi-cooked foods by advancing a corner of a spatula along the continuous contour of the ridge until it easily slides under the food, providing sufficient support as it releases and lifts the food from the cooking surface.

Further, once liquid has congealed by cooking from a first side initially in contact with the pan, the cook need not return the cook foods to the same region of the pan, but in fact produces a more aesthetically pleasing food item by placing the flipped pancake or food item onto the wider griddle surface area.

Although it should be appreciated that the area of the enclosed regions 141 and 142 can be partially defined by the wall 120, this is less preferred. Using the wall 120 to define a part of the enclosed region increases the difficultly of removing partially cooked item without shape distortion. Leaving even a narrow space between the ridge 141 and wall 120 enables the use of a spatula to release and slide free the cooked food that has assumed the shape of the convex ridge on its bottom surface. A spatula is readily slipped between a portion of the convex ridge and the partially cooked or semi-fluid food. This permits the food to release from the pan's cooking surface and easily slide up and over the convex ridge of the opposite side of the enclosed region without hitting the adjacent wall 120, which might distort the food item before it is flipped to cook the other side. Thus, larger area 170 adjacent to the enclosed region(s) 141 and 142 is suitably dimensioned to contain a mirror image of the enclosed regions, and thus receives the flipped pancake or other food item, with minimum skill and dexterity on the part of the cook.

Thus, the instant invention enables the preparation of pancakes and other foods prepared by congealing a liquid component during cooking in the enclosed region, with an aesthetically pleasing presentation as the pancakes can be conveniently flipped with a spatula with a minimum of skill.

Another advantage of providing a larger planar cooking area 170 adjacent to the enclosed regions 141 and 142 is that it aids in consistent cooking of both sides of the pancake (by cooking the liquid batter in the circle for the first side, then moving the pancake from the circle to the flat area upon flipping to cook the second side).

Accordingly, in a preferred method of using the inventive grill pan, the cook first fills the circular or enclosed region with the liquid component, which then congeals on cooking from the first side that is in contact with the pan. The cook then removes the at least partially congealed food item from the circular area, flipping it over to place the second (uncooked) side in contact with the pan in the adjacent region. The adjacent and surrounding region is at least slightly larger in area that the circular region to receive the partially congealed food item that now has a shape predetermined by enclosed region. This sequence of cooking the first and second sides of the food item in different regions frees the enclosed region to receive additional liquid for cooking a second item. As the breakfast griddle design in the preferred embodiment provides two adjacent circular cooking areas with a slightly larger adjacent region for receiving both of the circular food items, the cook will need to remove the food items being cooked on the second side to empty the adjacent portion of the surrounding region before they flip over the next pair of food items. Thus, by observing the completion of cooking of subsequent food items in the enclosed region, the cook is prompted to remove the food item from the adjacent area before the second side is overcooked. Therefore, limited cooking experience is needed to prepare pancakes with the inventive breakfast griddle, as the cooked pancakes will be removed sequentially to a serving platter or a warming plate as the cook prepare to flip the next set of pancakes.

The inventive design also provides for cooking what is generally considered healthier foods, as the cooking oil or butter use and consumption can be minimized by limiting its application to the enclosed areas. This avoids the absorption of excess oil from the side of the pancake that occurs on a flat griddle.

The design also enables the convenient and simultaneous cooking of a variety of breakfast foods, for example by cooking different multiple foods in each enclosed region of the pan (eggs, hash brown style potatoes, pancakes and the like) as well as bacon or sausage on the flat area. The pan is particularly suited for this purpose, as the ridges do not preclude multiple uses while helping to segregate cooking oil, butter or fat (rendered from the food being cooked, such as bacon) in isolated regions of the pan In this way, an entire breakfast may be cooked in the same apparatus. Foods that cook faster are removed from the enclosed region, with the opposite side cooked on the larger flat surrounding region, (or placed there to stay warm depending on the location of the heating source with respect to the bottom of the pan.)

Thus, the pan of the instant invention minimizes cleaning of the pan for cooking different food types. For example, foods that render a higher proportion of fat can be cooked in the surrounding regions, as a contiguous pour spout 160 allows the rendered fat or excess cooking oil to be readily removed without spillage or contamination to other food items.

A further advantage of defining the enclosed region by continuous relatively shallow convex ridges is that the entire cooking area can be used when the consumer is not making pancakes.

Providing the cooking pan or griddle with a relatively high wall 120 provides another advantage in preventing or minimizing the spatter of oils outside the pan. Although the wall 120 need not be vertical, it should be noted that the wall height and orientation might be varied to more fully accommodate the range of food types to be cooked in the pan. For example, by providing a wall or edge to the pan three to ten times higher than the convex ridges the full area of the pan may be utilized for cooking or frying foods without detriment to the uniformity of heating or mixing the food items.

In such cases, it might be desirable to have a sloping or slanted wall as in an omelet pan, whereas for bacon and other high grease or fat content foods that might be expected to spatter, it would be preferred to have a horizontal wall to block oil spattered from areas adjacent to the wall.

The design and configuration of the convex ridge enables alternative configuration as well as uses of the basic invention in a variety of cooking utensil or pan formats, for example as a sauté pan, griddle and deeper frying pan.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Figure 3:
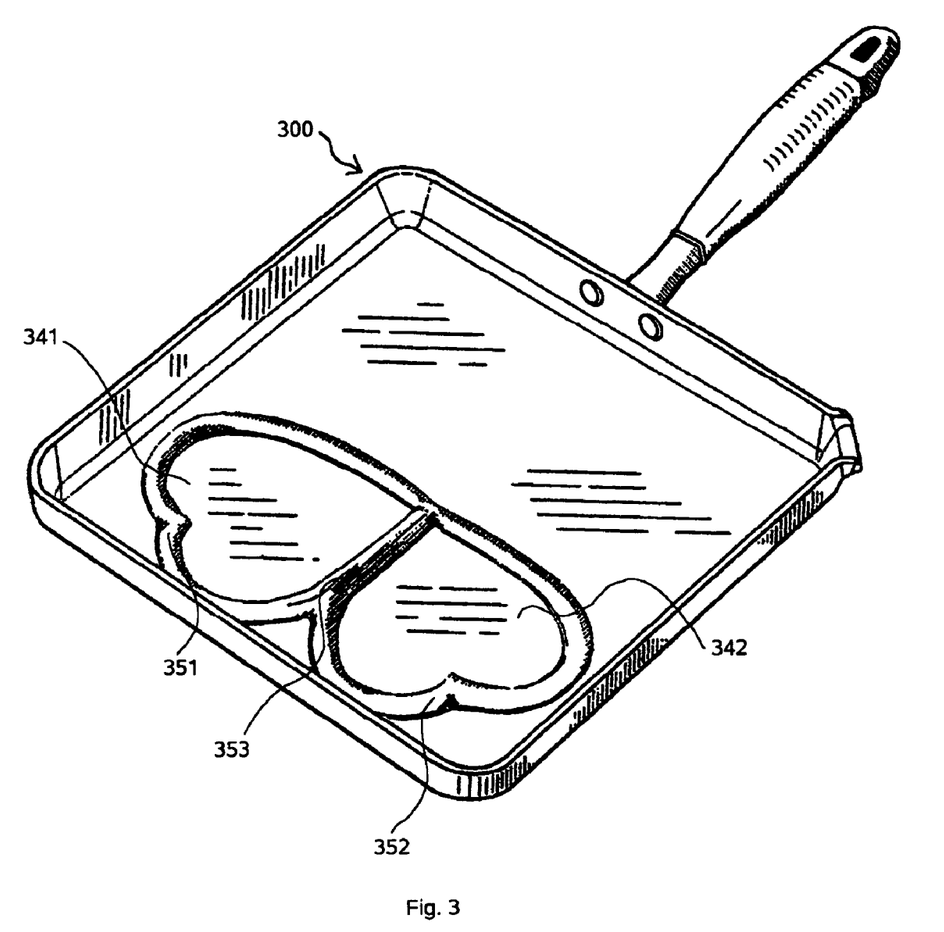
FIG. 3 shows a perspective view of an alternative embodiment of the cooking pan.

In some of these alternatives the size, shape and location of the convex ridges that define the pancake cooking area can include novelty shapes as well as circles. Such an alternative embodiment of a cooking pan 300 is illustrated in FIG. 3. The convex ridges 351 and 352 enclose areas 341 and 342 forming heart shapes, for producing heart shaped pancakes, thus making the pan an attractive gift for Valentine's Day. It should be noted that the heart shaped regions are adjacent to each other, with convex ridges 351 and 352 merging to a single, wider ridge over segment 353 to maximize the non-enclosed cooking surface area in proportion to the overall size of the pan.

Figure 4A:
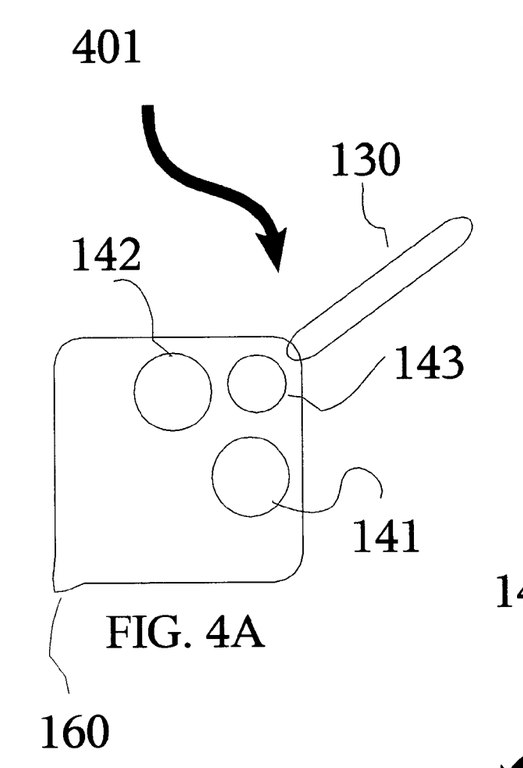
FIG. 4 shows another alternative embodiment in perspective view.
Figure 4B:
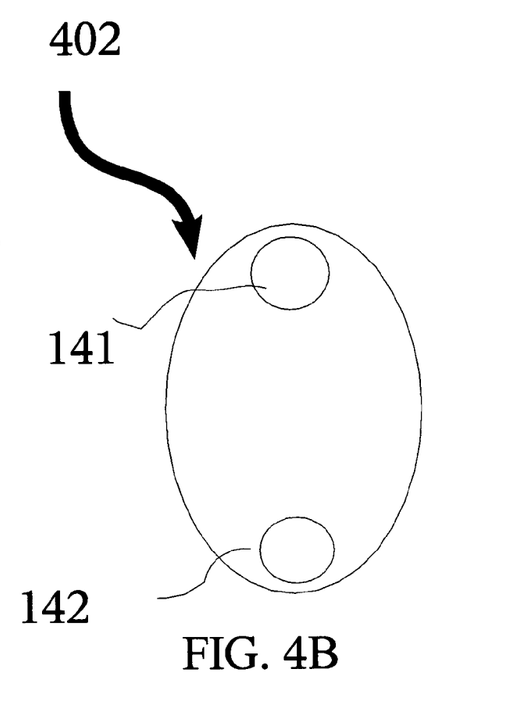
Figure 4C:
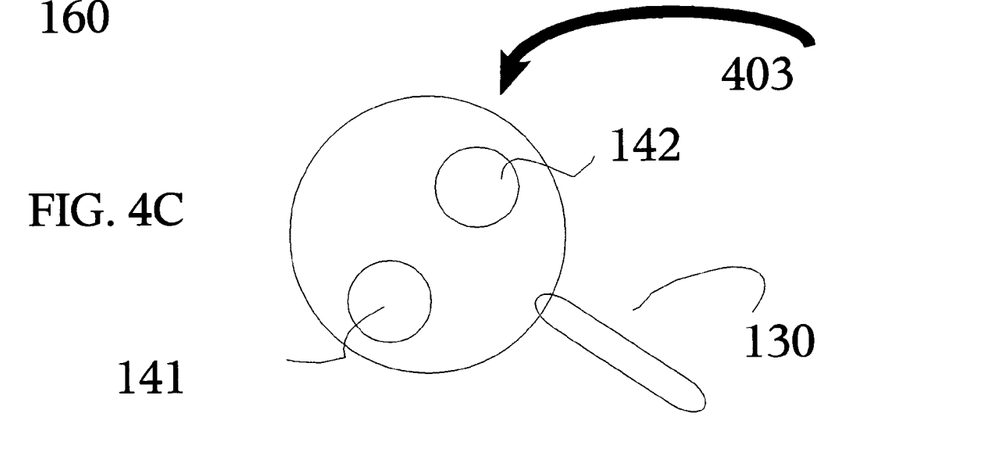

Further alternative embodiments of pan shapes, features and configurations of the enclosed regions are illustrated schematically in plan view in FIGS. 4A, 4B and 4C. FIG. 4C shows a circular pan 403, but omitting the optional pouring spout, and having two enclosed regions 141 and 142, which are now disposed on opposite sides of the pan with respect to the location of handle 130. It should be appreciated that the preferred alternative locations for an optional handle may take into consideration the location of the pouring spout 160 to provide the cook the most leverage in tilting the pan to remove fat, with the pouring spout preferably disposed at a corner or side most distal from either a single enclosed region or a group thereof. Further, a pouring spout can be located at any portion of a straight or round side, as well as a corner. For example, as shown in FIG. 4A, in non-circular pan 401 pouring spout 160 is located at the corner, rather than the center of a side as in FIGS. 1 and 3, across from handle 130 at the opposite corner. Non-circular pan 401 also includes an optional third enclosed region 143, which is slightly smaller than enclosed regions 141 and 142, forming the apex of a cluster of enclosed regions adjacent the corner of the pan associated with the handle 130.

FIG. 4B illustrates the topography of a dedicated stove top griddle style pan 402. The handle and pour spout are omitted, as the pan 402 remains in a fixed position relative to the stove top, but the enclosed regions 141 and 142 are now disposed to opposite sides of the cooking surface, rather than adjacent to each other.

In other embodiments, the interior of the pan is preferably coated with a non-stick material. Preferred methods of applying such coating include those disclosed in commonly assigned U.S. patent application number 2002/0094424, filed Jul. 18, 2002, which is incorporated herein by reference. The substantially planar bottom may also include grooves or other structures intended to improve the release of cooked foods and the durability of non-stick coating material, as further disclosed in commonly assigned U.S. Pat. No. 4,768,427, which is incorporated herein by reference.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A cooking pan comprising:
    a) a substantially planar cooking surface as the bottom of the pan,
    b) an upward extending peripheral wall attached to and surrounding said substantially planar cooking surface,
    c) at least one handle for grasping the cooking pan extending outward from said peripheral wall,
    d) wherein the substantially planar cooking surface is segregated into;
        i) at least one enclosed region defined by a convex ridge formed in the bottom of the pan, and
        ii) a second region substantially surrounding the at least one enclosed region, the second region extending to said upward extending peripheral wall,
        iii) wherein the bottom of the at least one enclosed region and the bottom of the second region are coplanar.

2. A cooking pan according to claim 1 wherein the convex ridge defines a circular enclosed region.

3. A cooking pan according to claim 2 further comprising a second circular enclosed region.

4. A cooking pan according to claim 3 wherein the first and second enclosed regions are adjacent to each other.

5. A cooking pan according to claim 1 wherein the surface area of the enclosed regions is not greater than the surface area of the surrounding region.

6. A cooking pan according to claim 1 wherein the maximum width of an enclosed region is not more than the greater of the width and length of the portion of the surrounding region adjacent the enclosed regions.

7. A cooking pan according to claim 1 wherein the portion of the surrounding region adjacent the at least one enclosed region is sufficiently large to contain a mirror image of the at least one enclosed region.

8. A cooking pan according to claim 5 wherein the convex ridge has a height of less than about 10 mm.

9. A cooking pan according to claim 8 wherein the convex ridge has a height of less than about 5 mm.

10. A cooking pan according to claim 8 wherein the height of the convex ridge is less than about one third the height of the peripheral wall.

11. A cooking pan according to claim 10 wherein the height of the convex ridge is less than about one fifth the height of the peripheral wall.

12. A cooking pan according to claim 8 further comprising a pouring spout formed in the peripheral wall.

13. A cooking pan according to claim 1 wherein said cooking surface and said peripheral wall define a substantially rectangular area and the enclosed region is substantially circular.

14. A cooking griddle according to claim 8 wherein the convex ridge is formed by deforming an initially planar bottom of the pan toward the cooking surface.

15. A cooking griddle comprising:
a) a substantially planar cooking surface segregated into;
   i) at least one enclosed region defined by a convex ridge extending upward from the cooking surface,
   ii) a second region substantially surrounding the at least one enclosed region,
   iii) wherein the bottom of the at least one enclosed region and the bottom of the second region are coplanar.

16. A cooking griddle according to claim 15 wherein convex ridge profile has a continuously curving profile and a height of less than about 6 mm.

17. A cooking griddle according to claim 16 wherein the continuously curving profile has a radius of curvature of at least about 2 mm and a height of less than about 5 mm.

18. A cooking pan comprising:
a) a substantially planar cooking surface as the bottom of the pan,
b) a peripheral wall attached to and extending upward to surround said substantial planar cooking surface,
c) at least one handle for grasping the cooking pan extending outward from said peripheral wall,
d) wherein the substantially planar cooking surface is segregated into;
   i) at least one enclosed region defined by convex ridge extending upward from the bottom of the pan, and
   ii) a second region defined by the convex ridge extending upward from the bottom of the pan, and adjacent the first region, the second region extending to said upward extending peripheral wall,
   iii) wherein the bottom of the at least one enclosed region and the bottom of the second region are coplanar.

19. A cooking pan according to claim 18 wherein the enclosed region has a maximum dimension of less than one-half the width of the bottom.

20. A cooking plan according to claim 18 comprising a second enclosed region.

21. A cooking pan according to claim 18 wherein the enclosed region is in the shape of a heart symbol.

22. A cooking pan according to claim 20 wherein the first and second enclosed region are adjacent each other and at least a portion of the convex ridges that define the first and second enclosed region merge to form a single convex ridge.

23. A cooking pan according to claim 20 wherein the surrounding region area is sufficiently large to contain a mirror image of the enclosed regions.

24. A cooking pan according to claim 22 wherein the enclosed region is disposed on the same side of the pan as said handle.

25. A cooking pan according to claim 22 further comprising a pouring spout disposed on the opposite side of the pan as the handle and the enclosed regions.

26. A cooking pan according to claim 20 wherein the cooking pan is substantially rectangular in shape.

* * * * *